United States Patent
Olmino (10) Patent No.: US 8,352,055 B2
(45) Date of Patent: Jan. 8, 2013

(54) METHOD FOR IMPLEMENTING PRODUCTION PROCESSES AND SYSTEM FOR EXECUTING THE METHOD

(75) Inventor: Paolo Olmino, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 580 days.

(21) Appl. No.: 12/569,127

(22) Filed: Sep. 29, 2009

(65) Prior Publication Data
US 2010/0082958 A1    Apr. 1, 2010

(30) Foreign Application Priority Data
Sep. 30, 2008   (EP) .................................. 08017168

(51) Int. Cl.
*G06F 19/00* (2006.01)
*G06F 17/60* (2006.01)
*G06F 17/50* (2006.01)
*G06F 9/45* (2006.01)

(52) U.S. Cl. .................. 700/97; 703/2; 703/15; 703/17; 703/22; 706/2

(58) Field of Classification Search ...................... 700/97
See application file for complete search history.

(56) References Cited

U.S. PATENT DOCUMENTS

| | | | | |
|---|---|---|---|---|
| 5,455,903 | A  * | 10/1995 | Jolissaint et al. | 715/835 |
| 6,167,423 | A    | 12/2000 | Chopra et al. | |
| 6,349,405 | B1   | 2/2002  | Welfeld | |
| 7,269,468 | B2 * | 9/2007  | Law et al. | 700/86 |
| 7,730,415 | B2 * | 6/2010  | Law et al. | 715/771 |
| 2002/0143505 | A1 * | 10/2002 | Drusinsky | 703/2 |
| 2004/0083011 | A1 * | 4/2004 | Ganz et al. | 700/19 |
| 2004/0244002 | A1 * | 12/2004 | Gauvin | 718/100 |
| 2005/0055695 | A1 | 3/2005 | Law et al. | |
| 2008/0270101 | A1 * | 10/2008 | Salmela | 703/17 |

FOREIGN PATENT DOCUMENTS
GB     2405705 A     3/2005

* cited by examiner

*Primary Examiner* — Mohammad Ali
*Assistant Examiner* — Sivalingam Sivanesan
(74) *Attorney, Agent, or Firm* — Laurence A. Greenberg; Werner H. Stemer; Ralph E. Locher (57) ABSTRACT

A method for implementing production processes includes a step of programming a state machine for each production process. The programming step includes a definition of a plurality of states and a definition of a plurality of transitions between states, corresponding to possible actions which the corresponding production process may execute. The programming step further includes the steps of detecting whether or not one or more states to be defined for a state machine have already been defined for state machines already programmed for other production processes, and executing the definition of states only for states not detected in the detecting step.

7 Claims, 9 Drawing Sheets

METHOD FOR IMPLEMENTING PRODUCTION PROCESSES AND SYSTEM FOR EXECUTING THE METHOD

CROSS-REFERENCED TO RELATED APPLICATION

This application claims the priority, under 35 U.S.C. §119, of European patent application EP 08 017 168.9, filed Sep. 30, 2008; the prior application is herewith incorporated by reference in its entirety.

BACKGROUND OF THE INVENTION

Field of the Invention

The present invention relates to a method for implementing production processes, including a step of programming a state machine for each production process. The step of programming includes, for each state machine, a definition of a plurality of states and transitions between states, corresponding to possible actions which the corresponding production process may execute. The present invention further relates to a system suitable for executing the method.

As it is well known, a method for implementing production processes comprises at least a step of programming a state machine for each production process, wherein a plurality of states and transition between states, are defined and correspond to the possible actions which may be executed by the production process.

Figure 1:
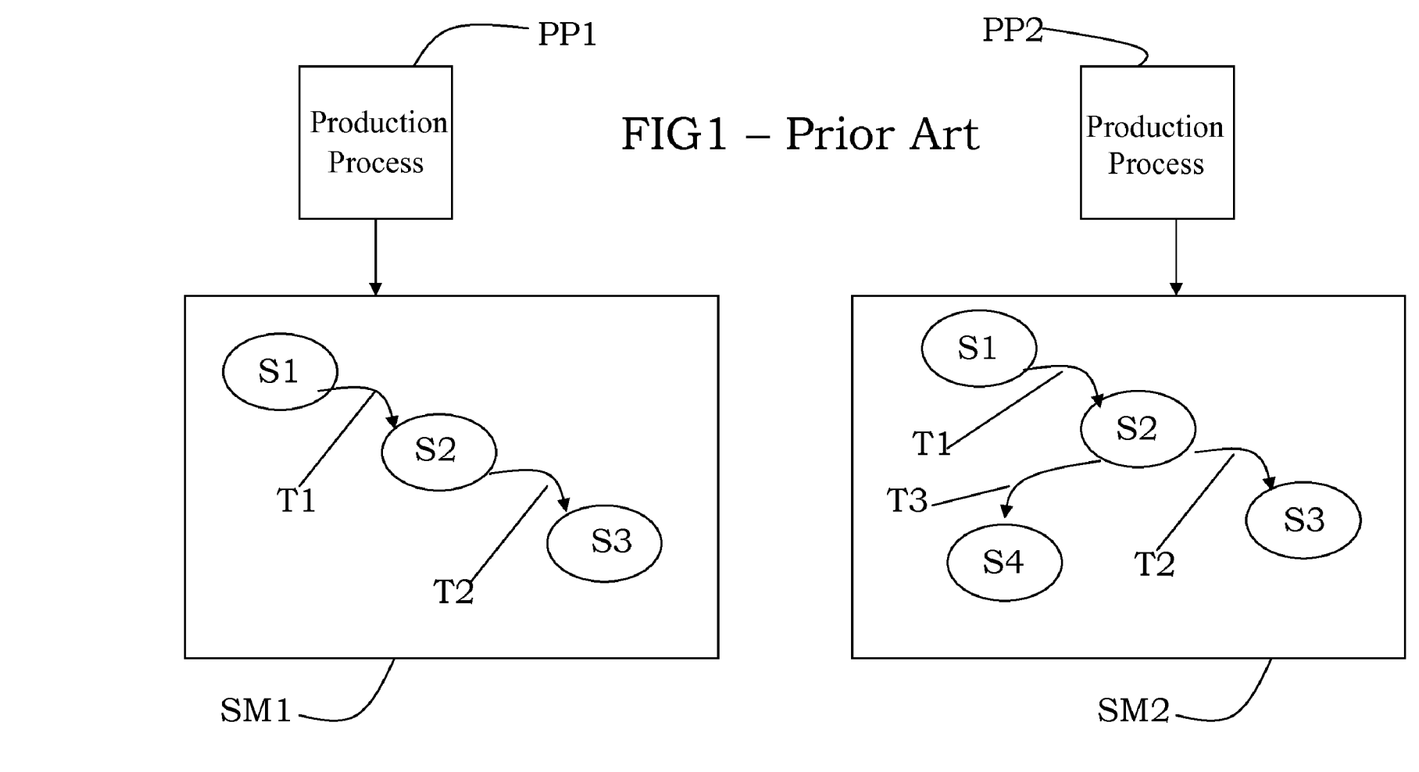
FIG. 1 schematically represents an implementation of production processes, according to the prior art.

With reference to FIG. 1, a first production process PP1 and a second production process PP2 respectively associated to corresponding state machines SM1, SM2 are schematically represented.

More particularly, the state machine SM1 includes the states S1, S2, S3, for example corresponding to an "Initial", a "Scheduled" and a "Completed" state of execution of the corresponding production process PP1, and respective transitions T1, T2, i.e. T1 corresponding to a transition from state S1 to state S2 and T2 to a transition from state S2 to state S3.

Similarly, the state machine SM2 includes the states S1, S2, S3, S4, for example corresponding to the "Initial", "Scheduled", "Completed" and to a "Suspended" state of execution of the production process PP2, and respective transitions, i.e. T3 corresponding to a transition from state S1 to state S2, T4 to a transition from state S2 to state S3 and T5 to a transition from state S2 to state S4.

It is also known that the programming of a new state machine may be executed starting from an already programmed state machine which includes one or more states to be defined for the new state machine, and which is substantially used as a template or model.

For example, with reference to FIG. 1, the state machine SM2 may be programmed starting from the state machine SM1, with the inclusion of a new state S4 and a new transition T3, which is the transition from state S2 to state S4. In the same way, a state machine SM3 schematically represented in FIG. 2, may be programmed starting from the state machine SM2, with the further addition of a new transition T4, which is a transition from state S2 to state S4.

More particularly, the known methods for implementing production processes provide for storing, for each state machine SMi, the corresponding plurality of states Si and transitions Ti.

According to these methods, it is possible to modify the states and transitions of two different state machines independently one from the other, so that a new state machine programmed from a previous one used as a template may be customized, not only adding new states but also modifying the states copied from the template.

Even if the known methods are advantageous because it is easier and faster to program a new state machine starting from an already programmed one used as a template or model, they have many disadvantages which are apparent here below.

Figure 2:
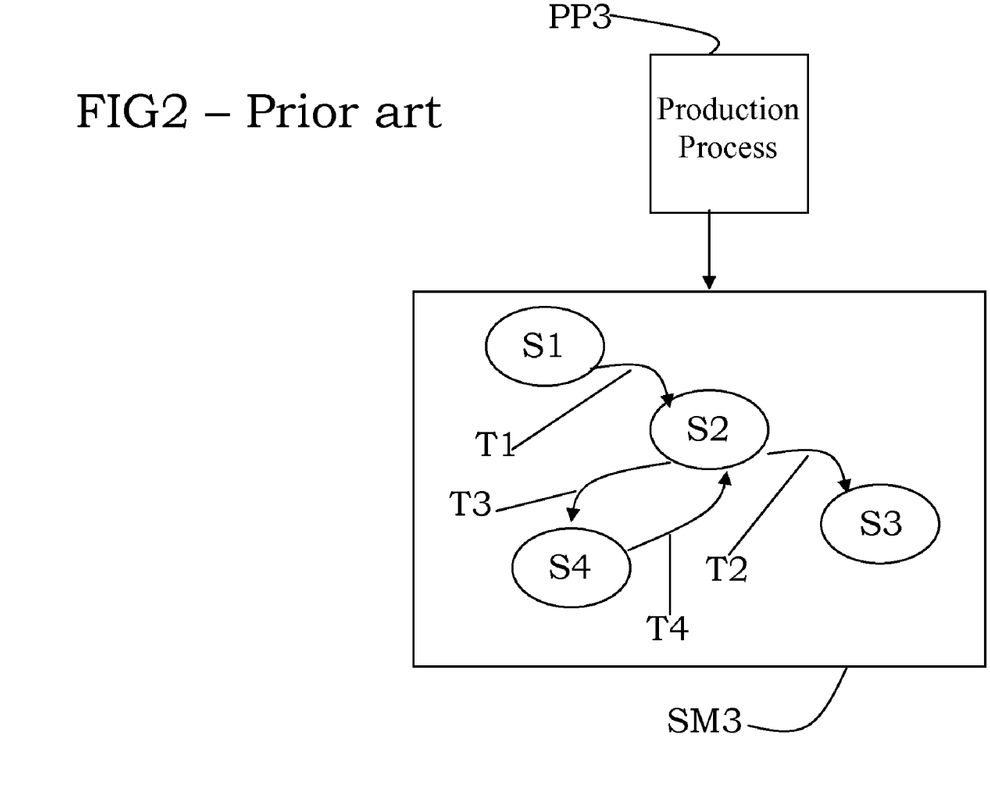
FIG. 2 schematically represents the implementation of a further production process, according to the prior art.

First of all, if the state machine SM2 is modified, for example modifying the status S2, i.e. the "Scheduling" associated to the production processes PP2, this change is not automatically reported on state machines SM1 and SM3, with the consequence that the state referred by "Scheduling" in three different state machines SM1, SM2, SM3 does not correspond to the same actions to be performed.

This problem is better explained by the following example, which is supported by the schematic representation of FIG. 1. State machine SM1 is programmed for a production process for producing a car and includes states S1, S2, S3, wherein S2, for example, includes the actions for assembling the seats inside the car and is referred as "Seat Assembling" state.

State machine SM2 is programmed starting from SM1 as a template, with the states S1, S2, S3 and the corresponding transitions already defined for state machine SM1, with the addition of a further state S4, for example, including the actions of mounting a special option, e.g. the GPS navigator.

The state S2, "Seat Assembling" in state machine SM1 is modified after state machine SM2 has been programmed, for example including the actions for mounting a headrest on each seat of the car. However, the modification of state "Seat Assembling" of state machine SM1 is not automatically reported on state "Seat Assembling" of state machine SM2, with the consequence that two production processes of the plant, both referred by "Seat Assembling", have substantially different behavior.

In order to avoid the problem described above, the modification of state S2, which has been already programmed on state machine SM1, should be reported on state machine SM2, with the disadvantage of loosing many times for maintaining the state machines correctly aligned with each other, especially when thousands of productions processes for a plant are implemented by thousands of state machines.

As it is apparent for a skilled person in the art, a further disadvantage of the known methods is that high memory and computational resources are required for implementing the production processes because a plurality of states and corresponding transition are loaded for each state machines corresponding to a production process.

SUMMARY OF THE INVENTION

It is accordingly an object of the invention to provide a method and a system, which overcome the above-mentioned disadvantages of the heretofore-known devices and methods of this general type and which provides for a method for implementing production processes in a Manufacturing Executing System (MES), wherein a state machine is programmed for each corresponding production process, the method further providing that a modification of a state defined for a state machine is automatically reported on all the other state machines including the modified state and already programmed for corresponding production processes, the method further reducing the memory and computational resources required for executing the overall production processes and overcoming the limitations that currently affects prior art methods.

With the foregoing and other objects in view there is provided, in accordance with the invention, a method for implementing production processes, wherein a state machine is programmed for each production process and the programming step includes, for each state machine:

defining a plurality of states and transitions between the states, corresponding to possible actions to be executed in the corresponding production process;

detecting whether or not one or more states to be defined for a state machine have already been defined for state machines already programmed for other production processes; and carrying out the defining step only for states not detected in the detecting step.

In other words, the objects of the invention are achieved by providing a method for implementing production processes wherein each production process is associated to a state machine including only transitions, and wherein the states involved in the transitions of the state machines are defined and stored only one time, separately by the transitions.

More particularly, the programming of a state machine provides the definition of states and transitions but the definition of a state is executed only if such state has not been created previously for another state machine.

The states are accessible to all the state machines implementing the production processes. More particularly, the transitions of such state machines, also indicated as transition group, are associated to the states and not stored together therewith.

According to such idea of solution, the technical problem mentioned above is solved by a method for implementing production processes, including a step of programming a state machine for each production process, the step of programming including, for each state machine, a definition of a plurality of states and transitions between states, corresponding to possible actions which the corresponding production process may execute, characterized by comprising a step of detecting if one or more states to be defined for the state machine have been already defined for a state machine already programmed for another production process and a step of executing said definition of states only for states not detected in the step of detecting.

The step of programming further comprises a step of defining a states group including all the states corresponding to the production processes. Advantageously, when a state is modified, this modification is automatically reported on all the state machines whose transitions are automatically associated to the modified state in the states group and, consequently, on all the corresponding production processes.

The step of programming also comprises storing the states group corresponding to the production processes in a memory portion which is shared by said state machines and to store, in each state machine, only the plurality of transitions corresponding to possible actions of the corresponding production process.

Advantageously, this allows using less memory and computational resources, because all the states are stored only one time in the shared memory portion and they are not stored a plurality of time for all the state machines. This advantage is particularly marked when a plant floor involve thousands of production processes, i.e. thousand of state machines thereto associated, because each state machine store only a transition group and not the corresponding states.

Advantageously, the method provides that the production processes are easily and quickly updated because the modification of a state is executed only one time and reported automatically on all the state machines thanks to the use of a single states group shared by all state machines of the production processes.

With the above and other objects in view there is also provided a system for implementing the above method. The novel system for implementing a plurality of production processes comprises:

a device for storing a state machine for each production process of the plurality of production processes, each state machine being defined by a plurality of states and transitions between the states, corresponding to possible actions which the corresponding production process may execute;

means for detecting whether or not one or more states to be defined for a state machine are defined for another state machine already programmed for another production process; and a software program tool driven by said detecting means and, when executed on a computer, defining states only for states not detected by said detecting means.

In other words, the technical problem described above is also solved by a system that is suitable for implementing production processes, including a device storing a state machine for each production process, wherein each state machine is defined by a plurality of states and transitions between states, corresponding to possible actions which the corresponding production process may execute. The system further comprises:

means for detecting if one or more states to be defined for a state machine are defined for another state machines already programmed for other production processes; and a software program tool driven by the comparator, for executing the definition of states, only for states not detected by the comparator.

Other features which are considered as characteristic for the invention are set forth in the appended claims.

Although the invention is illustrated and described herein as embodied in method for implementing production processes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 3:
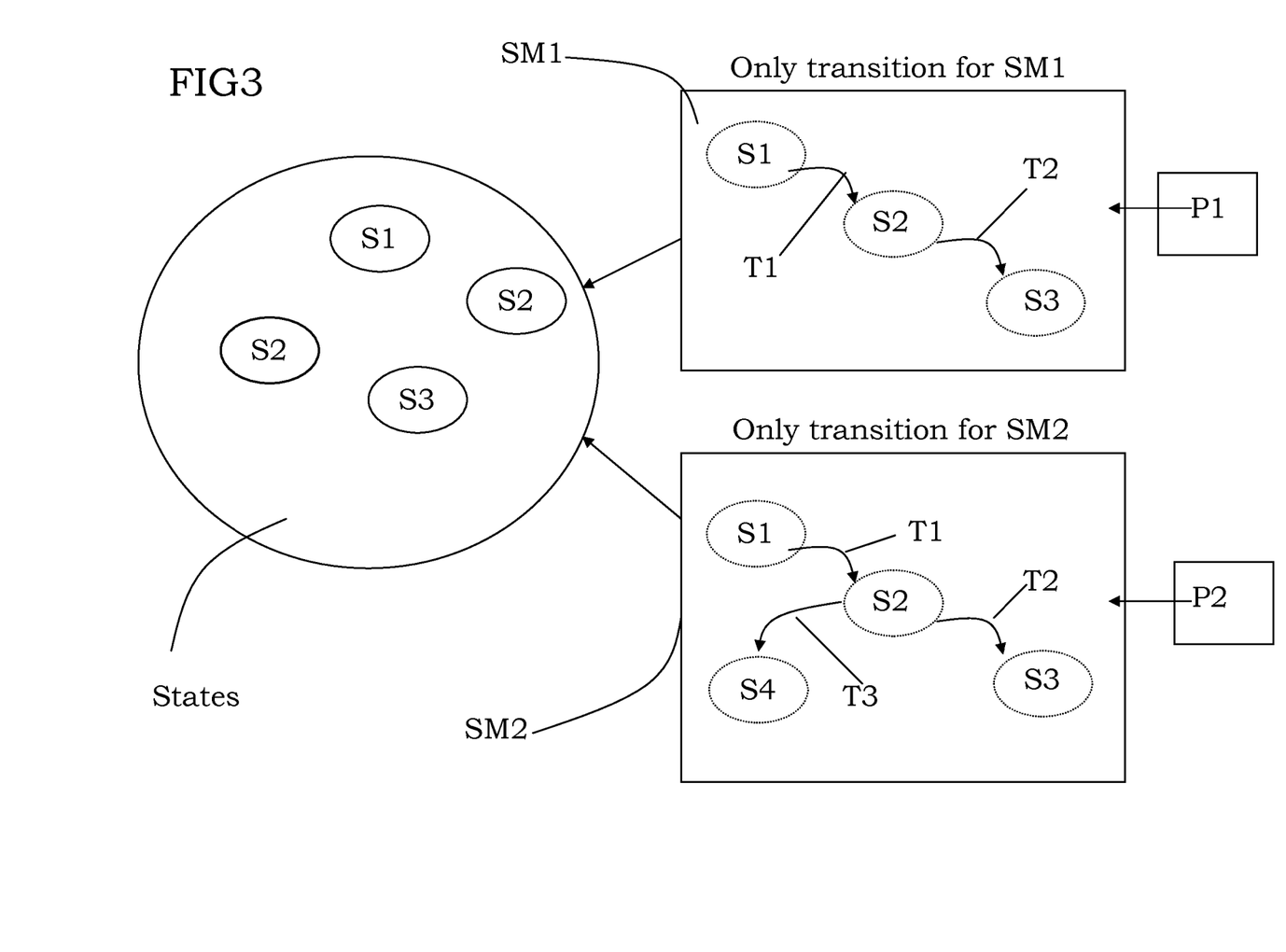
FIG. 3 schematically represents the implementation of production processes, according to the method of the present invention.

With reference to FIG. 3, a plurality of production processes PP1, PP2 are schematically represented with corresponding state machines SM1, SM2 which are programmed by defining a plurality of states and transitions between states, corresponding to possible actions which may be executed by the respective production processes PP1, PP2.

More particularly, the production processes PP1, PP2 are of the type planned by an Enterprise Resource Planning (ERP) and produced by a plant floor, the method according to the invention being executed in a Manufacturing Executing System (MES), for implementing planned production processes PP1, PP2.

For clarity and without limiting the scope of the present invention, the production processes PP1, PP2 at plant floor may be warehouse processes, production lines, paint works, baking, melting processes and the like, which may be produced in different production cells of the plant. However, different production processes PP1, PP2 may also be produced inside a same cell.

The method comprises a step of programming at least a state machine SM1, associated to a production process PP1, including the definition of states S1, S2, S3 and the definition of transitions T1, T2 between the states S1, S2, S3, i.e. T1 associated to the transition from S1 to S2 and T2 to the transition from S2 to S3, as schematically represented in FIG. 3.

The step of programming is also executed for programming the state machine SM2 of FIG. 3, which is associated to another production process PP2, including the definition of states S1, S2, S3, S4 and the definition of corresponding transitions T1, T2, T3 between said states S1, S2, S3, S4, i.e. transition T1 associated to the transition from S1 to S2, T2 to the transition from S2 to S3 and T3 to the transition from S3 to S4.

According to the method of the present invention, the programming of state machines SM1, SM2 also comprises a step of detecting if one or more states S1, S2, S3, S4 to be defined for a state machine SM2 have been already defined for another state machine SM1 which has been already programmed for another production process PP1 at plant floor.

More particularly, according to the invention, the step of programming executes the definition of states only for states S4 which are not detected in said step of detecting, i.e. for states which have not been already defined. In other words, states S1, S2, S3 already defined for state machines SM1, which have been previously programmed, are not defined again for the state machine SM2; only states S4 are provided.

The step of programming requires low computational resources with respect to the known methods because, for each state machine SM1, SM2, the definition of a new state S4 is executed only if such state has not been previously defined.

More particularly, if all the states S1, S2, S3 of a state machine SMi to be programmed already exist, the definition of states is not executed at all for such new state machine SMi.

Advantageously, when a state S2 is modified, for example including an additional action to be performed at plant floor for completing such state, the modification is automatically reported into all the state machines SM1, SM2 involving such state S2. This advantage is apparent from the example reported below, given without limiting the scope of the invention and again with reference to FIG. 3.

In the example, it is supposed that a state machine SM1 should be programmed for a production process for producing a car, wherein states S1, S2, S3 should be defined.

State S2 comprises, for example, the actions for assembling the seats inside the car and is referred as "Seat assembling" state. States S1, S2, S3 have not been previously defined for any state machines programmed for other production processes of the plant. It is also supposed in this example that another state machine SM2 should be programmed for another production process for producing a car, wherein the same states S1, S2, S3 should be defined as well as an additional state S4. Also states S4 has not been previously defined for any state machines of the plant.

According to the method of the present invention, the programming step comprises the programming of the state machine SM1, including the definition of states S1, S2, S3 and the corresponding transitions T1, T2.

The programming step for state machine SM1 executes the detection of states already created and returns that no states S1, S2, S3 required by state machine SM1 have been previously defined for other state machines. Consequently, the programming step comprises the execution of the definition of states for all the states S1, S2, S3 associated to state machine SM1.

After the programming of state machine SM1, state machine SM2 is programmed. The step of detecting states detects that states S1, S2, S3 required by state machine SM2 have been already defined for state machines SM1, while states S4 has never been defined. The programming step for state machine SM2 thus comprises the execution of the definition step only for state S4, because states S1, S2, S3 are already defined, while all the transitions T1, T2 and T3 are defined.

If state S2, "Seat Assembling" is modified after the programming of both state machines SM1 and SM2 is completed, for example including the actions for mounting a headrest on each seat of the car, the modification is automatically reported on all state machines SM1, SM2 so that the same actions are executed by the corresponding production processes PP1, PP2.

The step of programming further comprises a step of defining a states group including all the states corresponding to the production processes. More particularly, the states group is stored in a memory portion M which is shared by all the state machines SM1, SM2 programmed while, in each state machine, only the plurality of transitions corresponding to possible actions of the corresponding production process are stored.

Figure 4:
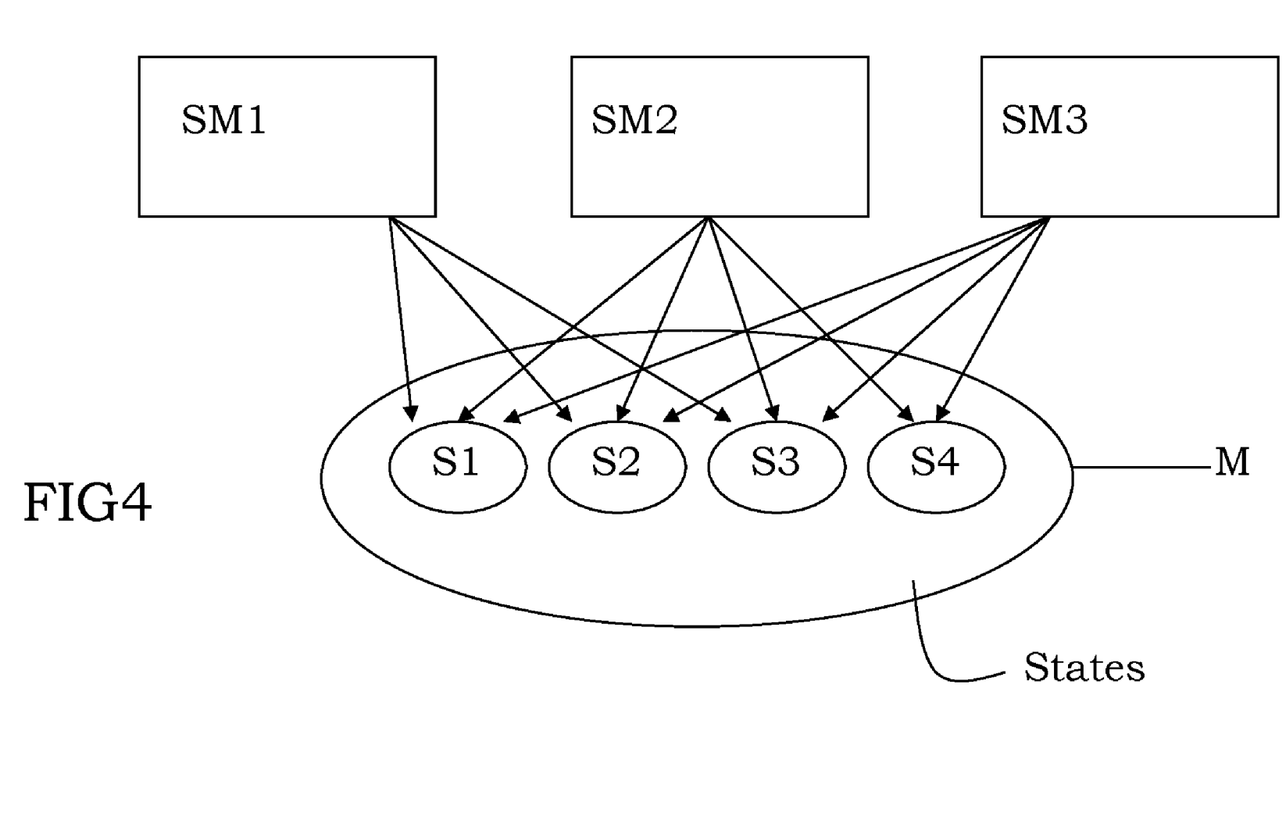
FIG. 4 schematically represents, in a different view, the implementation of production processes according to the method of the present invention.

As schematically represented in FIG. 4, the method advantageously requires low memory resources with respect to known methods because the states S1, S2, S3, S4 are not included in state machines SM1, SM2, SM3 but only in the memory portion M, providing great enhancement in term of performance, especially when thousand of production processes are implemented and executed through corresponding thousand of state machines.

More particularly, the step of programming comprises associating, for each state machine SM1 and SM2, one or more states S1, S2, S3, S4 of the state group stored in the shared memory M. Again with reference to FIG. 3, states S1, S2, S3 are associated to state machine SM1 and states S1, S2, S3, S4 are associated to state machine SM2.

According to the invention, the step of programming stores inside the state machine SM1 only the transitions T1, T2 corresponding to possible actions of the respective production process PP1 with respect to states S1, S2, S3 of the state group and inside state machine SM2 only the transitions T1, T2, T3 associated to the possible actions of the respective production process PP2 with respect to states S1, S2, S3, S4 of the state group.

Advantageously according to the invention, a state machine corresponding to a production process is actually a transition group because, it substantially corresponds to a set of transitions and it will be hereafter indicated in this way. The relationship between states and transition groups is a many to many relationship, as schematically represented in FIG. 4, since two or more transition groups are associated to two or more states S1, S2, S3, S4 separately stored in the state group.

With reference to FIGS. 5A-5E the phases for programming a new transition group "Custom" and for deleting it are schematically represented and described here below.

Figure 5A:
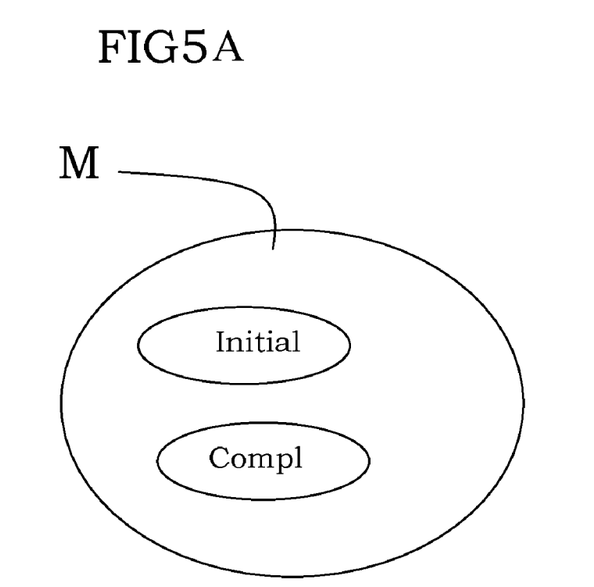
FIGS. 5A-5E schematically represents the step of programming state machines in different phases of execution, according to the method of the present invention.

More particularly, FIG. 5A represents states "Initial" and "Completed", which are stored in the shared memory M, an already programmed transition group "System" and an empty transition group "Custom" which is programmed by a CreateTransitionGroup("Custom", . . . ) function, at least including a parameter indicating the name "Custom" for the empty transition group.

Inside the transition group "System" there is already defined a transition "Initial→Completed" from the state "Initial" to the state "Completed".

More particularly, in FIGS. 5A-5E states are drawn inside the transition group because they are involved in the transitions comprised therein but, as described above, they are separately stored as a state group in the shared memory portion M.

Figure 5B:
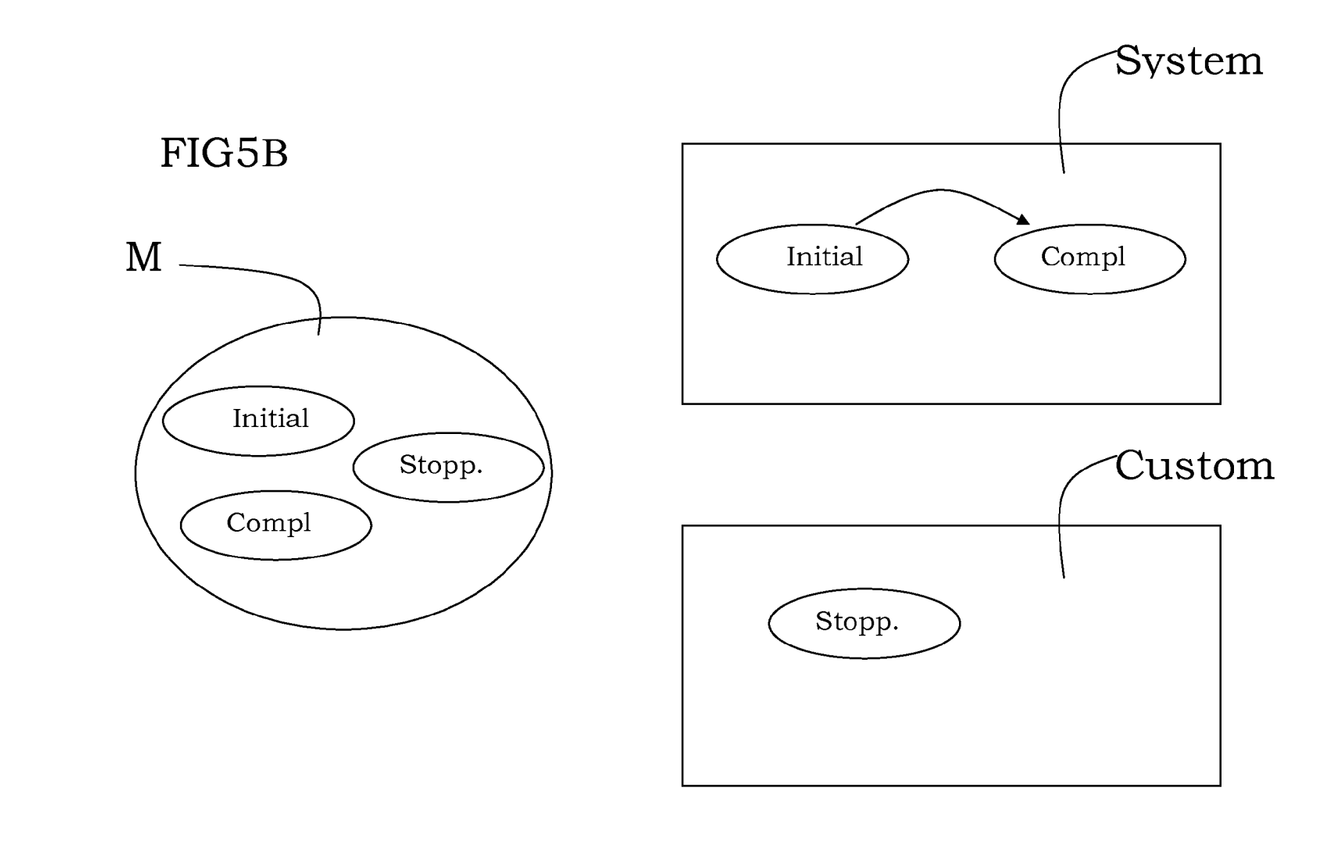

FIG. 5B schematically represents the definition of a new state "Stopped" which has not been defined for the transition "System". The method of the invention provides to store the state "Stopped" inside the shared memory portion M and to associate it to the transition group "Custom", even if this last does not yet comprise any transition thereto referred.

More particularly, the association of states to a transition group which does not comprise any transitions involving such states, also referred as "pre-use" association of a state, is provided because only after the association, the transitions may be defined. More particularly, the association of the state "Stopped" to the transition group "Custom" is programmed by an AddTransition("Stopped", "Custom") function, at least comprising two parameters indicating the name "Custom" of the transition group and the name of the status "Stopped" associated thereto.

Figure 5C:
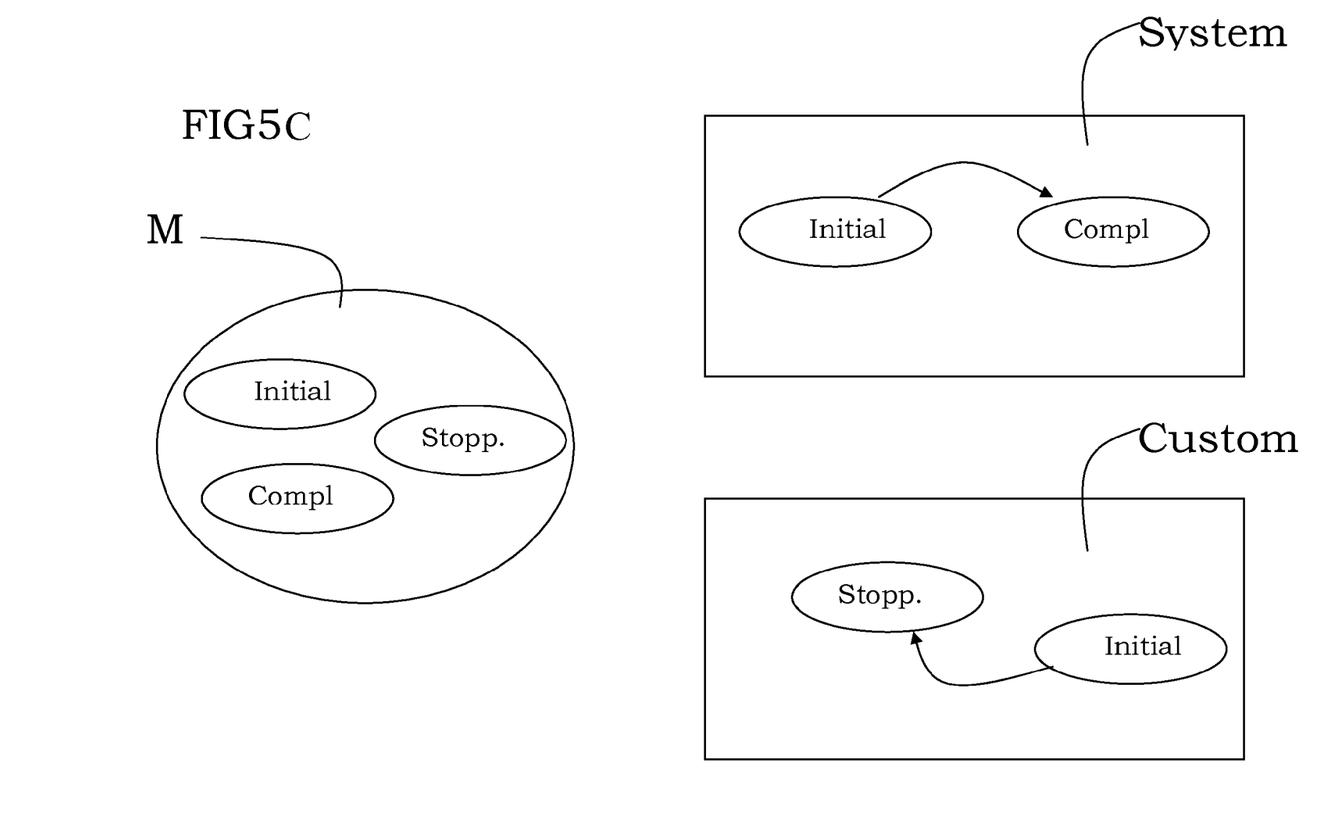

FIG. 5C schematically represents the association of the state "Initial" to the transition group "Custom", which has already been defined for the programming of state machine "System".

In this case, the definition of a new transition from state "Initial" to state "Stopped", also indicated as "Initial→Stopped" is implemented by a function AddTransition("Custom", "Initial", "System", "Stopped", "Custom") comprising a first parameter "Custom" indicating the transition group for which the new transition is defined, a second parameter indicating a source state "Initial" for the new transition "Initial→Stopped", a third parameter relating to the transition group "System" for which the source state "Initial" has been already defined, a fourth parameter "Stopped" relating to the target state involved by the transition "Initial→Stopped", and a last or fifth parameter being referred to the transition group "Custom" for which the target state "Stopped" has been defined.

Figure 5D:
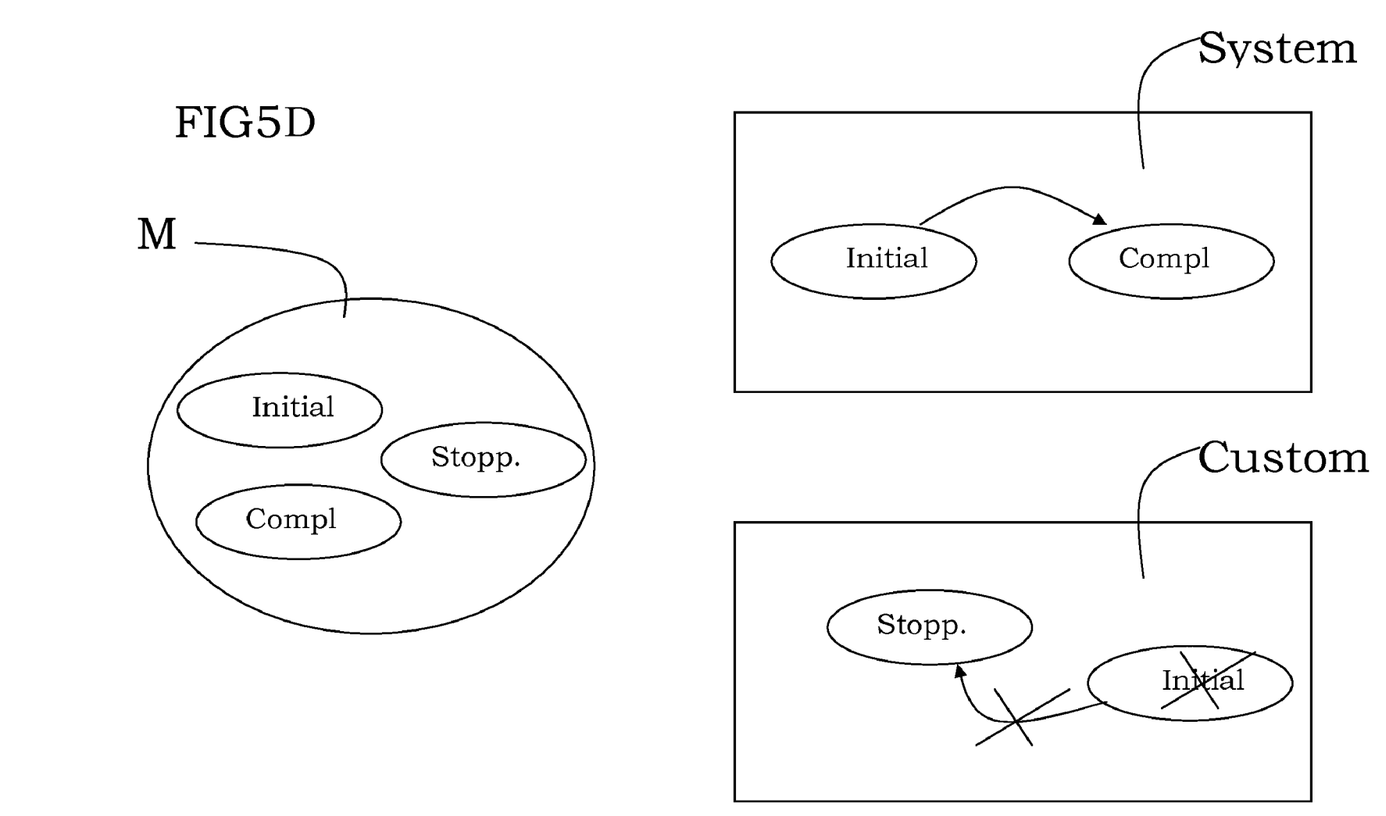

A modification of a state machine is schematically represented in FIG. 5D and described hereafter, e.g. in case of a deletion of the transition "Initial→Stopped".

According to the invention, the programming of state machines comprises a step of deleting transitions from a transition group including the following:

a step of detection of states involved in the transition to be deleted, which is executed to detect if the state, for instance the source state "Initial" of such transition, has been defined for other transition groups, a phase of executing the deletion of the source state "Initial" if no transition groups associated to such source state "Initial" has been detected and a phase for deleting the transition to be deleted.

In the example of FIG. 5D, the "Initial" state has been associated also to transition group "System" and, consequently, only the transition "Initial→Stopped" is deleted by the transition group, while the "Initial" state is maintained in the shared memory portion M.

In order to remove a transition, the method comprises a function DeleteTransition("Custom", "Initial", "Stopped") wherein the parameters respectively relates to the transition group and to the source and target state of the transition to be removed.

As already described above, the state remains associated to the transition group even if this last does not comprise any transition thereto referred. In fact, after the deletion of the transition "Initial→Stopped", the state "Stopped" is not referred by any transition, since the transition deleted was the last transition referred to state "Stopped". This association is also referred by "post-use" association of a state.

Figure 5E:
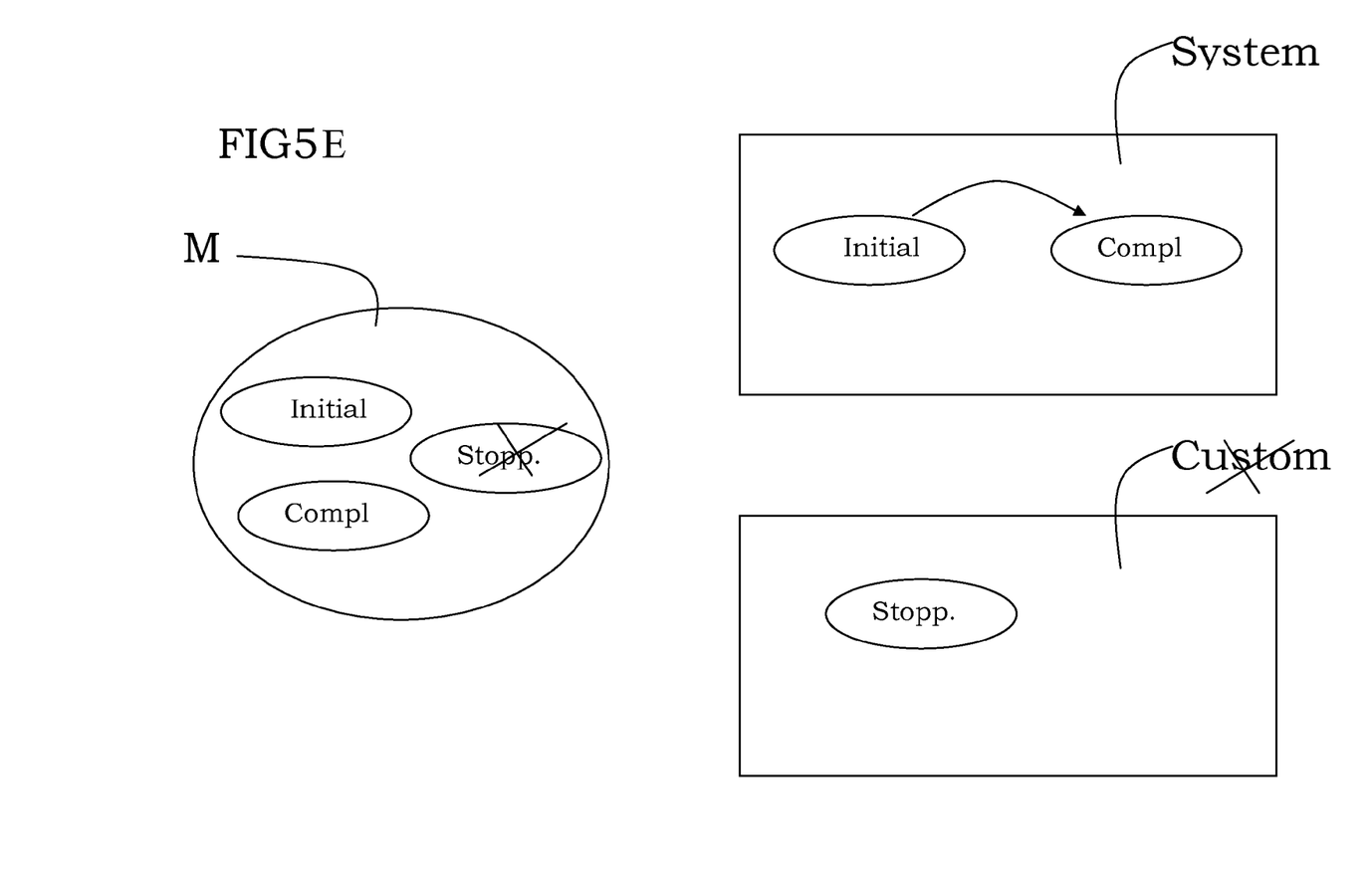

With reference to FIG. 5E the deletion of the transition group or state machine "Custom" is represented. Also in this case a phase of detection is executed to detect if one or more states "Stopped" still associated to the transition group are associated also to other transition groups, a phase of executing the deletion of said one or more states if no transition groups thereto associated are detected and a phase for deleting the transition group.

In the example of FIG. 5E, the "Stopped" state has been associated only with the transition group "Custom" and, consequently, it is deleted from the shared memory portion M after the deletion of the transition group "Custom".

More particularly, a function DeleteTransitionGroup ("Custom") is provided, including at least the name of the transition group to be deleted.

According to the present invention a system suitable for implementing production processes PP1, PP2 by using the above described method is further disclosed, the system including a device storing a state machine SM1, SM2 for each production process PP1, PP2, wherein each state machine SM1 is defined by a plurality of states S1, S2, S3 and transitions T1, T2 between states S1, S2, S3, corresponding to possible actions which the corresponding production process PP1 may execute.

The system also comprises means for detecting if one or more states S1, S2, S3, S4 . . . Sn to be defined for a state machine SM2 are defined for another state machines SM1 already programmed for other production processes PP1 and a software program tool driven by the means for detecting, for executing the definition of states only for states S4 not detected by said means.

The software program tool use a state group including all the states S1, S2, S3, S4 . . . Sn corresponding to the production processes PP1, PP2, which is stored in a memory portion M and shared by the state machines SM1, SM2.

The states group is stored in a memory portion M of the device which is shared by the state machines SM1, SM2. The state machines comprise one or more memory links associating respective states S1, S2, S3.

Each state machine SMi linked to states S1, S2, S3 stores one or more transitions T1, T2 involving the linked states S1, S2, S3.

The means for detecting further provides detecting if one or more transitions T1, T2 to be deleted involve states S1, S2, S3 linked to another state machine SM2 which is programmed for another corresponding production processes PP2, the software program tool being driven by the means for deleting only transitions S3 not involving the detected states.

The means for detecting further provides detecting if a state machine to be deleted SM2 involves states S1, S2, S3, S4 which are associated also to another state machine SM1, programmed for another production processes PP1; the software program tool is driven by the means for detecting, for executing the deletion of state machine SM2 and for deleting the states which are not associated to another state machine SM1.

Preferably, the system according to the invention uses a graphical interface including a state group box comprising a graphical representation of states of the state group stored inside the shared memory portion M and a plurality of transition group boxes for a graphical representation of transition groups. A drag and drop function is provided to drag a state from the state group box and drop it into a transition group box, and for associating the state to the transition group.

Some advantages of the method and system according to the present invention are outlined in the following:

When a state is modified, this modification is automatically reported on all the state machines whose transitions are associated to the modified state and, consequently, on all the corresponding production processes, thanks to the storing of all states as the states group which is stored in the shared memory portion.

Less memory and computational resources are required with respect to known methods, because all the states are stored only one time in the shared memory portion and they are not stored a plurality of time for all the state machines, with the additional need of ensuring their alignment from one state machine to another. This advantage is particularly evident when a plant floor involve thousands of production processes, i.e. thousand of state machines associated thereto, because each state machine store only a transition group and not the corresponding states which are only once stored as a state group in the shared memory portion.

Advantageously according to the invention, production processes are easily and quickly updated because the modification of a state is executed only one time and reported automatically on all the state machines.

The invention claimed is:

1. A method for implementing production processes, which comprises the following method steps:
   programming a state machine for each production process, the programming step including, for each state machine:
   defining a plurality of states and transitions between the states, corresponding to possible actions to be executed in the corresponding production process;
   detecting whether or not one or more states to be defined for a state machine have already been defined for state machines already programmed for other production processes; and
   carrying out the defining step only for states not detected in the detecting step;
   the programming step further including:
   defining a state group including all the states corresponding to the production processes;
   deleting one or more transitions stored in the state machine, including, and thereby:
   detecting whether or not the one or more transitions to be deleted involve states of the state group which are associated also with another state machine programmed for another corresponding production process; and
   executing the deletion of transitions only for deleting transitions not involving the states associated with other state machines.

2. The method according to claim 1, wherein the step of defining the state group comprises storing the state group in a memory shared by the state machines.

3. The method according to claim 2, wherein the programming step comprises associating, for each state machine, one or more of the states of the state group.

4. The method according to claim 3, wherein the programming step comprises storing in each state machine one or more transitions involving the states associated therewith.

5. A method for implementing production processes, which comprises the following method steps:
   programming a state machine for each production process, the programming step including, for each state machine:
   defining a plurality of states and transitions between the states, corresponding to possible actions to be executed in the corresponding production process;
   detecting whether or not one or more states to be defined for a state machine have already been defined for state machines already programmed for other production processes;
   carrying out the defining step only for states not detected in the detecting step;
   defining a state group including all the states corresponding to the production processes, and
   wherein the programming step further comprises a step of deleting the state machine, including:
   detecting whether or not the state machine to be deleted involves states which are associated also with another state machine programmed for another production process;
   executing the deletion of the state machine;
   executing a step of deleting the states which are not associated with the other state machine; and
   executing a step of deleting the state machine.

6. A system for implementing a plurality of production processes, the system comprising:
   a device for storing a state machine for each production process of the plurality of production processes, each state machine being defined by a plurality of states and transitions between the states, corresponding to possible actions which the corresponding production process may execute;
   a states group including all states corresponding to the production processes, said states group being stored in a memory portion of a device shared by said state machines;
   one or more memory links associating, for each state machine, respectively one or more of said states, and wherein each state machine linked to states associated therewith stores one or more transitions involving said states;
   means for detecting whether or not one or more states to be defined for a state machine are defined for another state machine already programmed for another production process;
   wherein said detecting means further detect whether or not one or more transitions to be deleted involve states linked to another state machine that is programmed for another corresponding production process, and wherein said software program tool is driven by said detection means for deleting only transitions not involving said states; and a software program tool driven by said detecting means and, when executed on a computer, defining states only for states not detected by said detecting means.

7. The system according to claim 6, wherein said detecting means is configured to detect whether or not a state machine to be deleted involves states that are associated also with another state machine that is programmed for another production process, and wherein said software program tool is driven by said means for executing the deletion of a state machine and the deletion of the states that are not associated with another state machine.

\* \* \* \* \*